United States Patent
Yang

(10) Patent No.: US 8,491,393 B2
(45) Date of Patent: Jul. 23, 2013

(54) CHEAT PREVENTION METHOD, SYSTEM AND CLIENT TERMINAL FOR ONLINE GAME

(75) Inventor: Qian Yang, Shenzhen Guangdong (CN)

(73) Assignee: Tencent Technology (Shenzhen) Company Ltd., Shenzhen (CN)

(*) Notice: Subject to any disclaimer, the term of this patent is extended or adjusted under 35 U.S.C. 154(b) by 1004 days.

(21) Appl. No.: 12/193,407

(22) Filed: Aug. 18, 2008

(65) Prior Publication Data

US 2009/0011829 A1 Jan. 8, 2009

Related U.S. Application Data

(63) Continuation of application No. PCT/CN2007/000859, filed on Mar. 16, 2007.

(30) Foreign Application Priority Data

Mar. 17, 2006 (CN) .......................... 2006 1 0057088

(51) Int. Cl.
*A63F 13/12* (2006.01)
(52) U.S. Cl.
USPC ............................................ 463/42; 709/206
(58) Field of Classification Search
USPC .................. 463/29, 40–42; 709/206, 207, 204
See application file for complete search history.

(56) References Cited

U.S. PATENT DOCUMENTS

| 6,641,481 B1 * | 11/2003 | Mai et al. ........................ 463/42 |
| 6,677,968 B1 * | 1/2004 | Appelman ..................... 715/853 |
| 2003/0233537 A1 * | 12/2003 | Wohlgemuth et al. ........ 713/151 |
| 2004/0242321 A1 | 12/2004 | Overton ........................ 463/29 |

FOREIGN PATENT DOCUMENTS

JP 2003-205176 A 7/2003

OTHER PUBLICATIONS

International Search Report for Application No. PCT/CN2007/000859 dated Jul. 12, 2007.
Office Action for Vietnam Patent Application No. 1-2008-02503, dated Dec. 14, 2011.

* cited by examiner

*Primary Examiner* — Damon Pierce
(74) *Attorney, Agent, or Firm* — Marshall, Gerstein & Borun LLP

(57) ABSTRACT

The present invention discloses a cheat prevention method for an online game. The method includes: determining, by the game server, a partner for a player according to information submitted by a game client terminal used by the player, and sending information of the partner of the player to the game client terminal used by the player; and refusing, by the game client terminal used by the player, to send a message to the partner of the player. The present invention also discloses a system and a client terminal in accordance with the method. The present invention can effectively prevent cheat in online games.

9 Claims, 4 Drawing Sheets

CHEAT PREVENTION METHOD, SYSTEM AND CLIENT TERMINAL FOR ONLINE GAME

CROSS-REFERENCE TO RELATED APPLICATIONS

This is a continuation of International Application No. PCT/CN2007/000859, filed Mar. 16, 2007, which claims the priority benefit of Chinese Patent Application No. 200610057088.6, filed Mar. 17, 2006, the entire respective disclosures of which are incorporated herein by reference.

FIELD OF THE INVENTION

The present invention relates to online game technologies, and particularly to a cheat prevention method, a cheat prevention system and a cheat prevention client terminal for online games.

BACKGROUND OF THE INVENTION

Along with the continuous development of online games, more and more Netizens have become regular players of the online games. At present, online chess and card games are mainstream online games and are usually carried out based on the Instant Messaging (IM) platform. The basic work flow of present online chess and card games is explained as follows.

When a user logs in a game platform, the user accesses a directory list of all online games and relevant information of each of the online games from a directory server (Dir-Svr). The relevant information of each of the online games includes number of game rooms and number of players in each of the game rooms. A game room is actually a game server (Game-Svr) to the user. The user may choose a game room in a game, i.e., a game server to log in. The game server is adapted to provide game service applications and save information of all players playing games on the game server. The information of all the players includes the number of times they have played and scores they have got. The information of the players is obtained from a background database server (DB-Svr), and changed information of each player will be saved by the DB-Svr. For example, in an online card game, before starting a round of game, the user needs to choose a table and wait for an adequate number of other players to come to the table and start the game after receiving agreements from the other players. A game service application running on the game server randomly distributes playing cards to the players and transmits the information of cards put on the table by one player to client terminals of the other three players for display. At the end of a round, the game service application determines results according to game rules and writes the latest information of the players into the DB-Svr. The players are all users playing the games.

In online chess and card games, cheat is commonly seen. At present, an online chess or card game in which the cheat may happen need at least four players. The at least four players are divided into two sides opposing each other, i.e. the players on the same side are partners and the players on different sides are opponents. In a fair game, the players should not learn deals on other players' hands beforehand. However, online games are special in that two partners may inform each other, via instant messenger or similar messaging tools, of deals on hand and discuss strategies, and which violates rules of fair play in the game. For example, in a card game of four players, players sitting at a table facing each other are usually supposed to be partners. Two players ready to cheat may deliberately choose the same table and seats facing each other at the table in the game. Therefore, the players can inform each other of deals on hand in the game for the purpose of cheating. The messaging tools mainly include instant messaging tools.

Technical measures need to be taken to prevent such cheat. The present online chess and card games provide a kind of cheat prevention technology, i.e. a player cannot choose a seat at a table after entering a game room and a game service application assigns a seat to the player at random, and the player cannot learn information of other players. In this way, cheating players cannot choose to sit on the same table as partners by their own will in the game because a player cannot choose his/her partner in the game and it is thus unnecessary and impossible for the players to pass cheating information to others.

However, the inventor of the present invention finds that a user may wish to choose a friend as a partner in a game in many occasions and the present cheat prevention technology just fails to satisfy such wish of the user.

SUMMARY

An embodiment of the present invention provides a cheat prevention method for an online game, applicable to a plurality of game client terminals and a game server.

The method includes:

determining, by the game server, a partner for a player according to information submitted by a game client terminal used by the player, and sending information of the partner of the player to the game client terminal used by the player; and refusing, by the game client terminal used by the player, to send a message to the partner of the player.

Another embodiment of the present invention provides a cheat prevention system for an online game, including a plurality of game client terminals and a game server.

Each of the game client terminals is adapted to submit information of a player who uses the game client terminal and refuse to send a message to a partner of the player according to information of the partner of the player received from the game server; and the game server is adapted to determine the partner of the player according to the information of the player submitted by the game client terminal and send the information of the partner of the player to the game client terminal.

Another embodiment of the present invention also provides a game client terminal, including:

a first module, adapted to submit information of a player who uses the game client terminal to a game server;

a second module, adapted to refuse, according to information of a partner of the player received from the game server, to send a message to the partner of the player who uses the game client terminal.

The cheat prevention method and system provided by embodiments of the present invention for online games can effectively prevent players who are partners in a game to send messages for the purpose of cheating to each other during the game. Such method and system do not prevent players from randomly choosing their own partners in the game. Therefore, the cheat prevention method and system provided by embodiments of the present invention are well applicable to the presently popular online chess and card games. The technical solution of the present invention ensures fair play in online games while providing user-friendly game services.

DETAILED DESCRIPTION OF THE INVENTION

This invention will hereinafter be described in detail with reference to accompanying drawings and specific embodiments.

An embodiment of the present invention discloses a cheat prevention method for an online game. The method is applied to a plurality of game client terminals used by players and a game server running a game application. The game client terminals used by the players collect information of the players at real time and submit the information to the game server. In the game, the game server determines a partner for a player according to the information of the player received from the game client terminal used by the player and sends the information of the partner of the player to the game client terminal of the player. Before sending a message to another game client terminal, the game client terminal of the player determines whether the message is destined for the partner of the player according to the received information of the partner of the player and refuses to send any message to the partner of the player.

The embodiment of the present invention is divided into two main parts. Firstly, the game server obtains the information of the players and issues the information of the partners. Secondly, each of the game client terminals of the players submits the information of the player and refuses to send a message to the partner of the player who uses the game client terminal. The part of obtaining the information of the players and issuing the information of the partners by the game server further includes: firstly, obtaining the information of players before the game starts; secondly, obtaining the information of the players and issuing the information of the partners after the game starts. The workflow is further explained in detail with reference to FIGS. 1 to 3.

Figure 1:
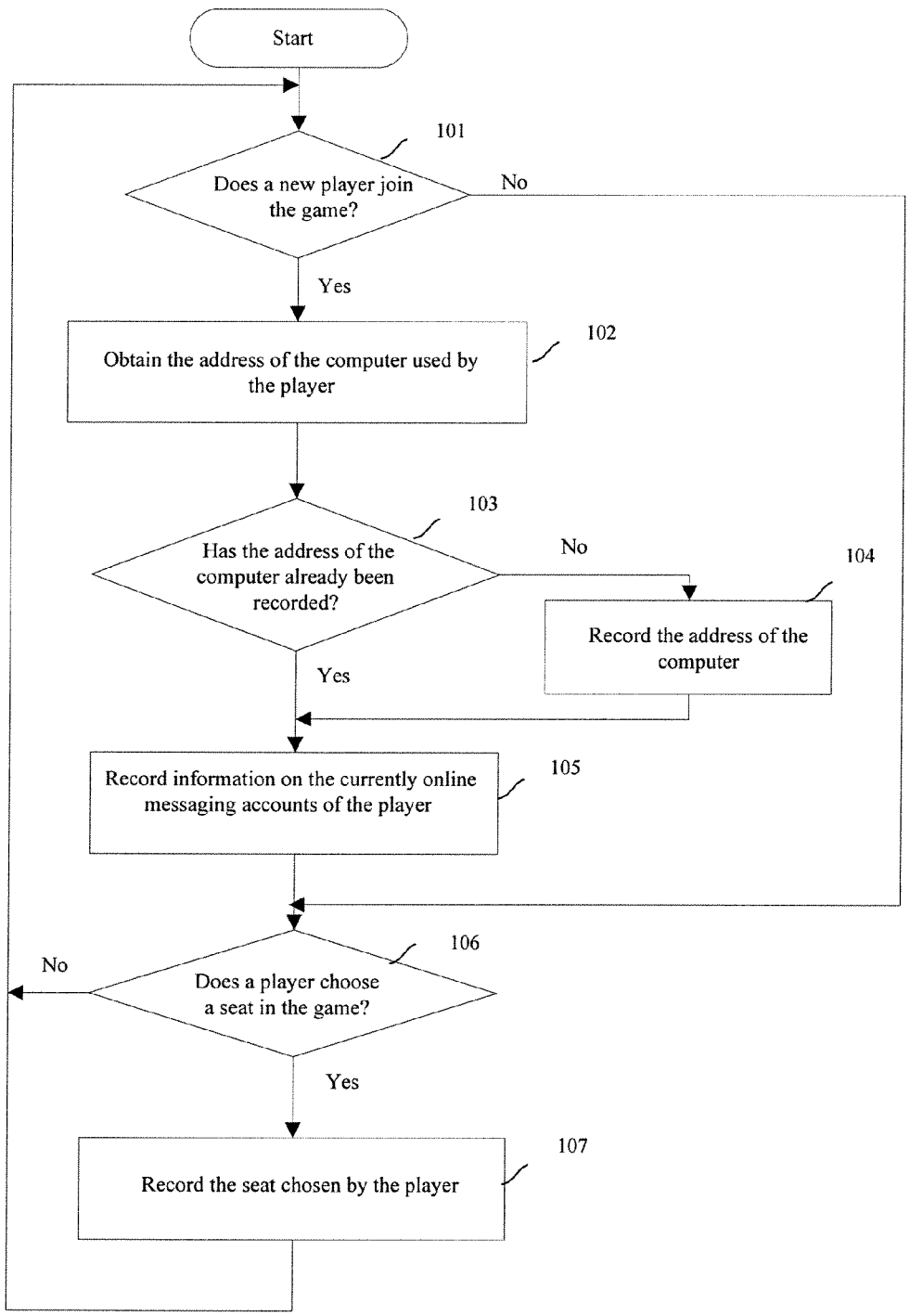
FIG. 1 is a flow chart illustrating initialization of a game server in accordance with an embodiment of the present invention.

FIG. 1 is a flow chart illustrating a process performed by a game server before the startup of a game in accordance with an embodiment of the present invention. As shown in FIG. 1, the process includes the following processes.

Block 101: A game server determines whether a new player joins the present game. If a new player joins, Block 102 is performed; otherwise, Block 106 is performed.

Block 102: The game server obtains address of a computer used by the new player. The computer used by the player is the computer on which the game client terminal used by the player is installed.

The address of the computer may be IP address of the computer. However, different computers connected to a backbone network through the same local area network may have the same IP address, and two computers in the same local area network will never have the same Media Access Control (MAC) address. Therefore, in order to accurately locate the computer used by the player, the combination of the IP address and the MAC address can be used to locate a computer in the network. Accordingly, the address of the computer may also include the combination of the IP address and the MAC address.

Block 103: The game server determines whether the address of the computer obtained in Block 102 has already been recorded before. If the address of the computer has been recorded before, Block 105 is performed; otherwise, Block 104 is performed.

Block 104: The game server records the address of the computer obtained in Block 102.

Block 105: The game server obtains and records one or more messaging accounts of the player. The player has already logged into the account on the local computer. The player may have more than one account to send messages online, e.g., the player may have logged into several accounts for instant messaging at the same time. Therefore, the accounts of the player for transmitting messaging messages obtained by the game server may be an account list containing at least one account. The term "account" herein is used for indicating an account for sending messages through a messaging tool, for instance, an instant messenger account for sending messages through an instant messenger tool. It should be noted especially that all of the game server and the game client terminals include a message transmission module and a game service module. The message transmission module and the game service module are interconnected to each other. The game service module in the game client terminal of the player can extract from the message transmission module the online account of the player for transmitting messages when the player joins the game, and the account for transmitting messages will be included in the information of the player and submitted to the game server.

Block 106: The game server determines whether a player in the present game has chosen a seat. If the player has chosen a seat, Block 107 is performed; otherwise Block 101 is performed.

Block 107: The game server records the seat chosen by the player.

When a player wishes to join the game, the player will logs in the game server through the game client terminal used by the player on the local machine and sends a request for joining the game to the game server. The request may carry an ID of the game to be joined by the player, the address of the computer used by the player and the one or more online messaging accounts of the player. The player may also send a request for choosing a seat in the game to the game server through the game client terminal and the game server will identify the partner of each player according to the seat chosen by the player.

The game server also provides cheat prevention function as well as game service applications in accordance with the present invention to prevent cheating. Hence, the game server needs to maintain a memory table to record the information of players. The information of the players includes: address n of computers used by the players, messaging accounts of the players and seats of the players in the game. The game server records the address of the computers used by the players, messaging accounts of the players and seats of the players in the game in the memory table at realtime.

In the process shown in FIG. 1, Blocks 101 to 105 are designed for new players and Blocks 106 to 107 are designed for players who chose seats in the game. The two parts can be performed concurrently and embodiments of the present invention do not require the two parts to be performed in any specific order. Among the Blocks from Block 101 to Block 105, the address of the computers used by the players is recorded in Blocks 102 to 104, the messaging accounts of the players are recorded in Block 105, and the operation of Blocks 102 to 104 is independent from that of Block 105. Therefore, one or more messaging accounts of a new player can be recorded first after finding the new player in Block 101.

Figure 2:
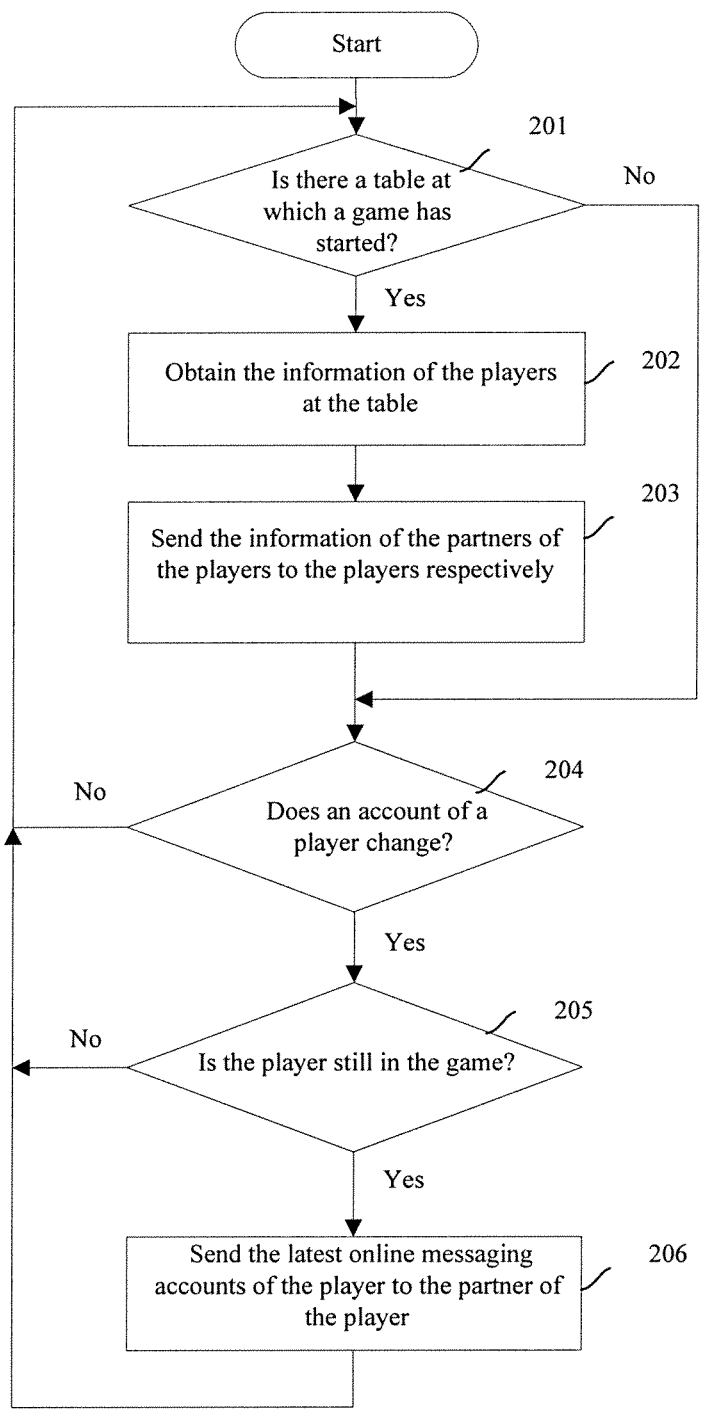
FIG. 2 is a flow chart illustrating actions taken by a game server at the startup of a game in accordance with an embodiment of the present invention.

FIG. 2 is a flow chart illustrating a process performed by a game server after the startup of a game in accordance with an embodiment of the present invention. As shown in FIG. 2, the process includes the following Blocks.

Block 201: A game server determines whether a new game starts on a table. If a new game starts, Block 202 is performed; otherwise Block 204 is performed.

It can be learnt from the description in the background of the present invention that for an online chess or card game, players may choose a game room and a table in the game room to start the game and then choose their seats at the table. Each round of the game is among the players at the table and players are divided into partners and opponents at the table in the game. Therefore, this Block is actually used for determining whether the game starts.

Blocks 202-203: The game server obtains information of the players at the table where the game starts and sends information of partners of the players to computers used by the players respectively.

In the process shown in FIG. 1, the game server maintains the memory table that saves the information of the players at realtime. The information of the players includes the address of the computers used by the players, messaging accounts of the players and seats of the players in the game. In this way, the information of all players at the table where the game starts can be obtained from the memory table and the partners of the players can be decided according to the seats of the players. The seat of a player can be indicated by the combination of a game room ID, a table ID and a seat ID. The information of the partners sent to the players mainly includes the messaging accounts of the partners that are currently online.

Block 204: The game server determines whether the currently online messaging accounts of the players change in the game. If the currently online messaging accounts of the players change, Block 205 is performed; otherwise Block 201 is performed.

The computers used by the players may inform the game server when the current online messaging accounts of the players change, e.g., the client terminals of the players may regularly check the working status of messaging tools on the local machine and inform the game server of the newly online and offline accounts of the player so that the game server may render the determination in Block 204.

Block 205: The game server determines whether the player whose messaging account is changed in Block 204 is still in the game. If the player is still in the game, Block 206 is performed; otherwise Block 201 is performed.

Block 206: The game server sends the latest one or more online messaging accounts of the player whose messaging account is found to have changed to the computer of the partner of the player.

The information of the messaging accounts can be sent to the computers of the players or the computers of the partners of the players according to the address of the computers obtained in the process shown in FIG. 1.

Figure 3:
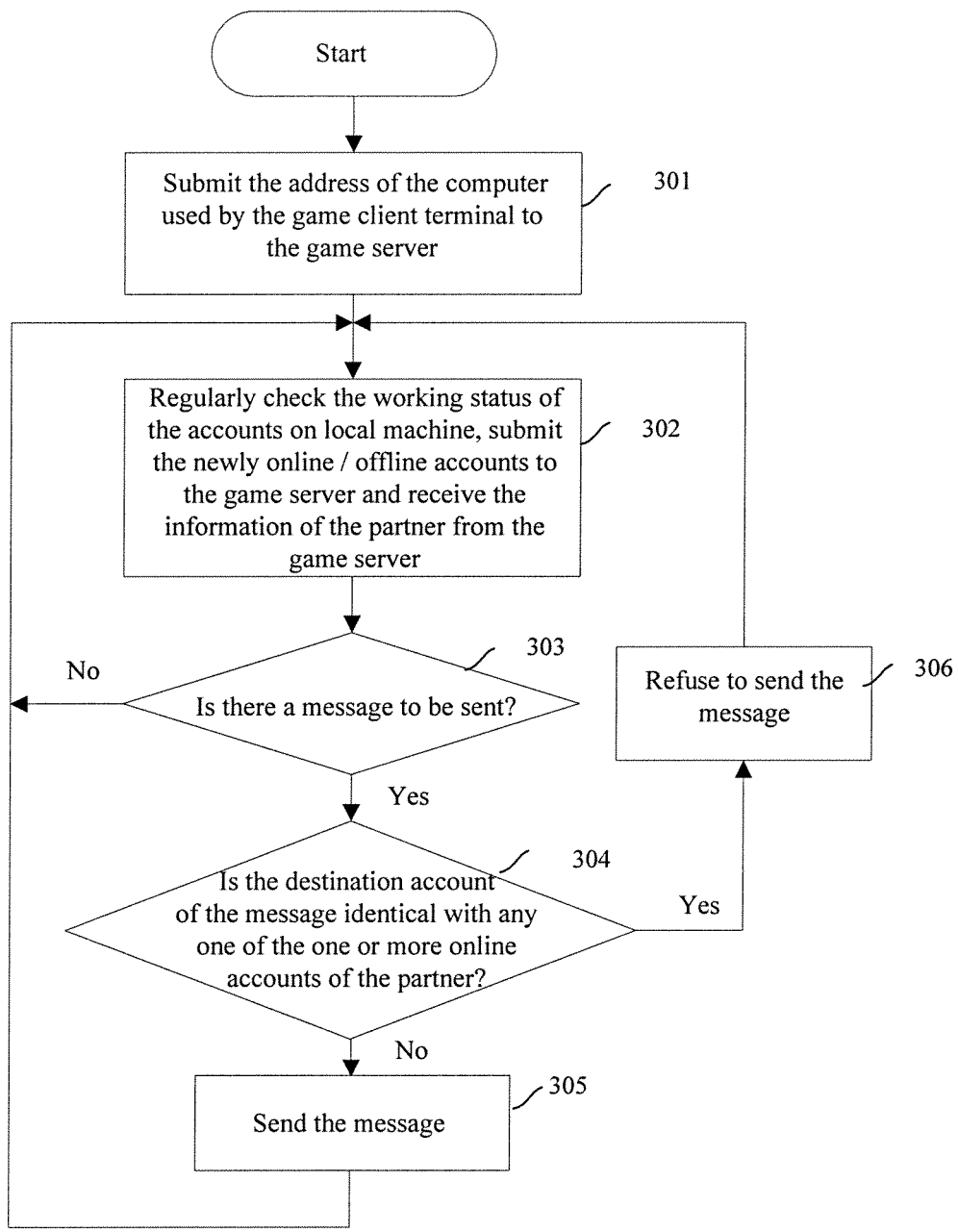
FIG. 3 is a flow chart illustrating actions taken by a game client terminal at the startup of a game in accordance with an embodiment of the present invention.

FIG. 3 is a flow chart illustrating a process performed by a game client terminal in accordance with an embodiment of the present invention. As shown in FIG. 3, the process includes the following processes.

Block 301: After the starting up, a game client terminal submits to a game server address of a computer on which the game client terminal is installed. The address includes the combination of the IP address and MAC address of the computer.

Block 302: The game client terminal regularly checks the working status of messaging tools on the local machine and informs the game server of the newly online and offline accounts of the player who uses the game client terminal. The game client terminal further receives the information of the partner of the player.

Block 303: The game client terminal determines whether there is a message to be sent at present. If there is a message to be sent, Block 304 is performed; otherwise Block 302 is performed.

Block 304: The game client terminal determines whether the message to be sent is destined for the partner of the player, i.e., whether the destination account of the message is one of the accounts of the partner in the received information of the partner. If the destination account of the message is one of the accounts of the partner, Block 306 is performed, otherwise Block 305 is performed.

Block 305: The game client terminal sends the message and Block 302 is performed.

Block 306: The game client terminal refuses to send the message and Block 302 is performed.

In the process shown in FIG. 3, the game client terminal may submit the messaging accounts of the player and receive the information of the partner in Block 302 while controlling the message transmission in Blocks 303 to 306. The embodiment of the present invention does not require the actions to be performed in any specific order and the game client terminal can control the message transmission as soon as the game client terminal obtains the information of the partner.

When a round of game ends or a player quits the game, the game server deletes the seat information of the player in the information of the player recorded in the memory table. When a new player joins the game, the game server sends the latest information of the partners of the players to the players at the startup of the game. When a player logs out of the game server, the game server further deletes all information of the player in the memory table.

An embodiment of the present invention further provides a cheat prevention system for an online game. The cheat prevention system includes a game server and a plurality of game client terminals. The game client terminals are the game client terminals used by the players in the game. The game client terminals are adapted to submit information of players to the game server and receive information of partners of the players from the game server, and are further adapted to refuse to send messages to their partners according to the information of the partners. The game server is adapted to receive the information of the players from the game client terminals, to determine the partners for the players according to the information of the players and sends the information of the partners to the game client terminals.

For the purpose of realizing the above functions, the game server may include: a player information collection module and a partner decision module. A game client terminal may include: a player information submission module and a message transmission control module. The workflow of the system provided by the present invention is explained with reference to the actions taken by the game client terminal of a player, the game client terminal of the partner of the player and the game server.

Figure 4:
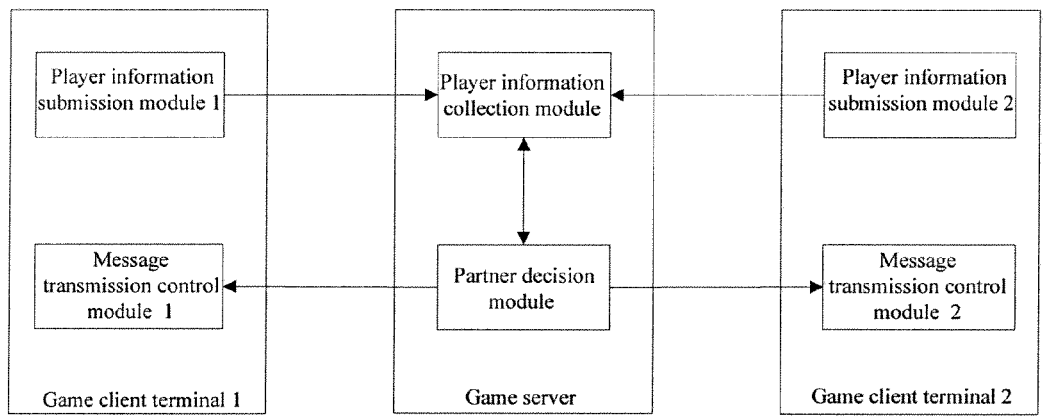
FIG. 4 is a structure schematic of a system in accordance with an embodiment of the present invention.

FIG. 4 is a structure schematic of a system in accordance with an embodiment of the present invention. The system in this embodiment includes game client terminal 1 and game client terminal 2 of Player 1 and Player 2, who are partners, and the game server. The game client terminal 1 used by Player 1 includes player information submission module 1 and message transmission control module 1. The game client terminal 2 used by Player 2, i.e. the partner of Player 1, includes player information submission module 2 and message transmission control module 2. The game server connected to the game client terminals 1 and 2 includes a player information collection module and a partner decision module.

The player information submission modules 1 and 2 are adapted to submit information of corresponding players to the player information collection module. The player information submission module 1 submits information of Player 1. The information of Player 1 includes: the address of the computer used by Player 1, the currently one or more online messaging accounts of Player 1 and the seat of Player 1 in the game. The player information submission module 2 submits information of Player 2. The information of Player 2 includes: address of the computer used by Player 2, the currently one or more online messaging accounts of Player 2 and the seat of Player 2 in the game. The player information collection module is adapted to receive the information of Players 1 and 2 from the player information submission modules 1 and 2 and export the information to the partner decision module. The partner decision module is adapted to extract the information of Players 1 and 2 from the information received from the player information collection module, determine the partners of Players 1 and 2 according to the seats of Players 1 and 2 in the game, which are recorded in the information of Players 1 and 2, and sends the information of the partners of Players 1 and 2 to the message transmission control module 1 of Player 1, and the message transmission control module 2 of Player 2. The information of the partners may include one or more messaging accounts of the partners, e.g., QQ accounts, which are currently online on the computers used by the partners. The message transmission control modules 1 and 2 are adapted to determine, before a message is sent from the computers on which corresponding game client terminals are installed, whether the destination account of the message is identical with one of the accounts in the received partner information. If the destination account of the message is identical with an account in the received partner information, the message transmission control modules 1 and 2 will refuse to send the message; otherwise the message can be sent normally. In this embodiment, Players 1 and 2 are partners of each other. Hence the information of the partner sent to the message transmission control module 1 includes the information of Player 2 and the information of the partner sent to the message transmission control module 2 includes the information of Player 1. Before sending a message, the message transmission control module 1 determines whether the message is destined for any of the online accounts of Player 2 and the message transmission control module 2 determines whether the message is destined for any of the online accounts of Player 1. In this way Players 1 and 2, who are partners of each other, are prevented from sending messages to each other in the game and the cheat is thus prevented.

FIG. 4 shows a system only consisting two game client terminals used by two players who are partners and a game server. The system provided by the present invention deals with a round of a game and each of the players in the game is associated with a game client terminal. Therefore, the system provided by the present invention actually consists of the game client terminals of all players in the game and the game server, and every two game client terminals used by players who are partners and the game server work in the way shown in FIG. 4. The workflows of systems consisting of different amount of game client terminals will not be described further herein, yet such systems are covered by the protection scope of embodiments of the present invention.

The embodiment of the present invention also provides a game client terminal and a server. The functions and compositions of the game client terminal and the server have already been illustrated in FIG. 4 and will not be explained further herein.

Figure 5:
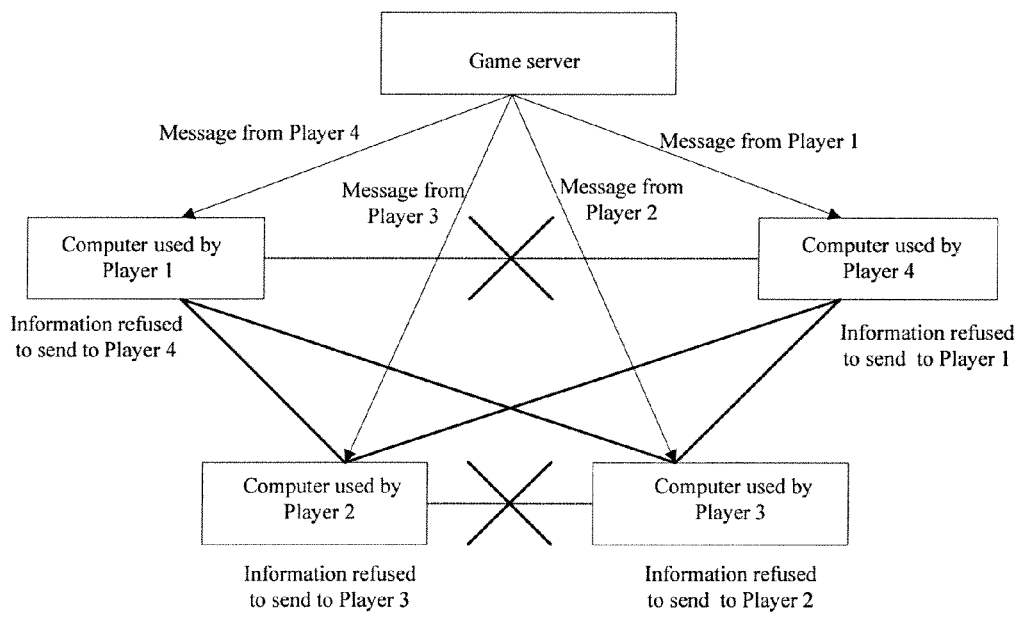
FIG. 5 is a schematic diagram illustrating connections among computers of game players in accordance with an embodiment of the present invention.

FIG. 5 is a schematic illustrating connections among computers of game players in accordance with an embodiment of the present invention. The system shown in FIG. 5 is used by a game of four players: Player 1, Player 2, Player 3 and Player 4. Before applying the embodiment of the present invention, the computers on which the game client terminals of Players 1, 2, 3 and 4 are installed can set up peer-to-peer connections to one another during the game for the purpose of peer-to-peer message transmission. However, in the embodiment of the present invention, as shown in FIG. 5, the game server determines the partners of the players according to the information of the players submitted by the game client terminals of Players 1, 2, 3 and 4. In FIG. 5, Players 1 and 4 are a pair of partners, and Players 2 and 4 are another pair of partners. The game server sends the information of Player 4 to Player 1 and the computer of Player 1 accordingly refuses to send a message to Player 4. The game server sends the information of Player 1 to Player 4 and the computer of Player 4 accordingly refuses to send a message to Player 1. The game server sends the information of Player 3 to Player 2 and the computer of Player 2 accordingly refuses to send a message to Player 3. The game server sends the information of Player 2 to Player 3 and the computer of Player 3 accordingly refuses to send a message to Player 2. Therefore, as shown in FIG. 5, the message transmission between Players 1 and 4 and the message transmission between Players 2 and 3 are cut off during the game, so that potential cheating actions between partners are thus prevented and fair play is ensured in the online game.

To sum up, embodiments of the present invention can effectively prevent cheating actions between players who are partners during a game. Furthermore, the solution of the present invention ensures fair play in online games and provides user-friendly game services without making much modification to the prior art. Therefore, the solution of the present invention is highly feasible.

The foregoing are only preferred embodiments of the present invention and are not for use in limiting the protection scope thereof. Any modification, equivalent replacement or improvement made is included in the protection scope of the claims of the present invention.

The invention claimed is:

1. A cheat prevention method for an online game, applied to game client terminals and a game server, the method comprising:

determining, by the game server, a partner for a player according to information submitted by a game client terminal used by the player, and sending information of the partner of the player to the game client terminal used by the player, wherein the information submitted by the game client terminal comprises an address of a computer on which the game client terminal is installed, one or more online messaging accounts of the player who uses the game client terminal and a seat chosen by the player in the game; and refusing, by the game client terminal used by the player, to send a message to the partner of the player;

submitting, by the game client terminal used by the player, the address of the computer on which the game client terminal is installed when the player newly logs in the game server;

submitting, by the game client terminal used by the player, the seat chosen by the player; and checking, by the game client terminal used by the player, the one or more online messaging accounts of the player in realtime, and submitting the one or more messaging accounts of the player;

wherein refusing, by the game client terminal used by the player, to send the message to the partner of the player comprises, refusing, by the game client terminal used by the player, to send the message when a destination account of the message is identical with any one of one or more online messaging accounts of the partner of the player.

2. The method according to claim 1, wherein submitting, by the game client terminal used by the player, the address of the computer on which the game client terminal is installed when the player newly logs in the game server comprises submitting, by the game client terminal used by the player, the address of the computer on which the game client terminal is installed to the game server when the player newly logs in the game server; the method further comprising:

determining, by the game server, whether the address of the computer on which the game client terminal of the player is installed has already been recorded; not recording the address of the computer if the address of the computer has already been recorded; and recording the address of the computer if the address of the computer has not been recorded.

3. The method according to claim 1, wherein checking, by the game client terminal used by the player, the one or more online messaging accounts of the player in realtime, and submitting the one or more messaging accounts of the player comprises checking, by the game client terminal used by the player, working status of messaging tools on the computer on which the game client terminal is installed, and informing the game server of the one or more newly online messaging accounts of the player; the method further comprising:

determining, by the game server upon the receipt of the one or more newly online messaging accounts of the player, whether the one or more newly online messaging accounts of the player has already been recorded, updating recorded messaging accounts with the one or more newly online messaging accounts of the player if the one or more messaging accounts of the player have already been recorded, and recording the one or more newly online messaging accounts of the player if the one or more messaging accounts of the player have not been recorded.

4. The method according to claim 3, wherein the one or more messaging accounts comprise an account list comprising at least one account.

5. The method according to claim 1, further comprising:
sending one or more latest online messaging accounts of the player to a game client terminal used by the partner of the player when a messaging account of the player in the game changes and the player is still in the game.

6. The method according to claim 1, further comprising:
sending, by the game client terminal used by the player, the message when the destination account of the message is not identical with any one of the one or more online messaging accounts of the partner of the player.

7. A cheat prevention system for an online game, comprising: game client terminals and a game server, wherein
each of the game client terminals is configured to submit information of a player who uses the game client terminal and refuse to send a message to a partner of the player according to information of the partner of the player received from the game server; and the game server is configured to determine the partner of the player according to the information of the player submitted by the game client terminal and send the information of the partner of the player to the game client terminal;

wherein the information of the player submitted by the game client terminal comprises an address of a computer on which the game client terminal is installed, one or more online messaging accounts of the player who uses the game client terminal, and a seat chosen by the player who uses the game client terminal in the game;

and each of the game client terminals is further configured to submit the address of the computer on which the game client terminal is installed when the player newly logs in the game server and the seat chosen by the player in the game, check one or more online messaging accounts of the player in realtime, submit the one or more online messaging accounts, and refuse to send the message when a destination account of the message is identical with any one of one or more online messaging accounts of the partner of the player.

8. The system according to claim 7, wherein
the game server is further configured to, when a messaging account of the player in the game changes and the player is still in the game, send one or more latest online messaging accounts of the player to a game client terminal used by the partner of the player.

9. A game client terminal, including:
a first module, configured to submit information of a player who uses the game client terminal to a game server; and
a second module, configured to refuse, according to information of a partner of the player received from the game server, to send a message to the partner of the player who uses the game client terminal;

wherein the information of the player submitted by the first module comprises an address of a computer on which the game client terminal is installed, one or more online messaging accounts of the player who uses the game client terminal, and a seat chosen by the player who uses the game client terminal in the game;

the first module is configured to submit the address of the computer on which the game client terminal is installed when the player newly logs in the game server and the seat chosen by the player in the game, check one or more online messaging accounts of the player in realtime and submit the one or more online messaging accounts;

the second module is configured to refuse to send the message when a destination account of the message is identical with any one of one or more online messaging accounts of the partner of the player.

* * * * *